United States Patent
Wittebrood

(10) Patent No.: US 7,536,031 B2
(45) Date of Patent: May 19, 2009

(54) TEMPORAL INTERPOLATION OF A PIXEL ON BASIS OF OCCLUSION DETECTION

(75) Inventor: Rimmert Bart Wittebrood, Eindhoven (NL)

(73) Assignee: NXP B.V., Eindhoven (NL)

( * ) Notice: Subject to any disclaimer, the term of this patent is extended or adjusted under 35 U.S.C. 154(b) by 510 days.

(21) Appl. No.: 10/569,681

(22) PCT Filed: Aug. 23, 2004

(86) PCT No.: PCT/IB2004/051530

§ 371 (c)(1),
(2), (4) Date: Feb. 27, 2006

(87) PCT Pub. No.: WO2005/022922

PCT Pub. Date: Mar. 10, 2005

(65) Prior Publication Data

US 2007/0002058 A1    Jan. 4, 2007

(30) Foreign Application Priority Data

Sep. 2, 2003    (EP)    ................................. 03103269

(51) Int. Cl.
*G06K 9/00*    (2006.01)
(52) U.S. Cl. .................... 382/107; 345/475; 345/60; 345/629; 375/240.01; 375/240.03; 375/240.16; 382/103; 382/166; 382/233; 382/236; 382/244
(58) Field of Classification Search ................. 345/475, 345/474; 375/240.27, 240.24, 204.16; 348/669; 382/106, 107, 108, 236
See application file for complete search history.

(56) References Cited

U.S. PATENT DOCUMENTS 5,557,684 A  *  9/1996  Wang et al. ................. 382/107

(Continued)

FOREIGN PATENT DOCUMENTS

GB         2279531        *   4/1995

(Continued)

OTHER PUBLICATIONS

A. Pelagotti, et al: A New Algorithm for High Quality Video Format Conversion, IEEE, vol. 1, No. 3, Conf. 8, Oct. 2001, pp. 375-378, XP010563776.

(Continued)

*Primary Examiner*—Jingge Wu
*Assistant Examiner*—Nancy Bitar

(57) ABSTRACT

A method of determining a value for a particular pixel of a particular image being temporarily located intermediate a first image and a second image is disclosed. The method comprises: computing a first motion vector difference on basis of a first ($D_p$) and second ($D_{pp}$) motion vector of a first motion vector field ($D_3(x, n-1)$) corresponding to the first image; computing a second motion vector difference on basis of a third ($D_n$) and fourth ($D_{nn}$) motion vector of a second motion vector field ($D_3(x, n)$) corresponding to the second image; and establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

10 Claims, 6 Drawing Sheets

U.S. PATENT DOCUMENTS

Figure 1:
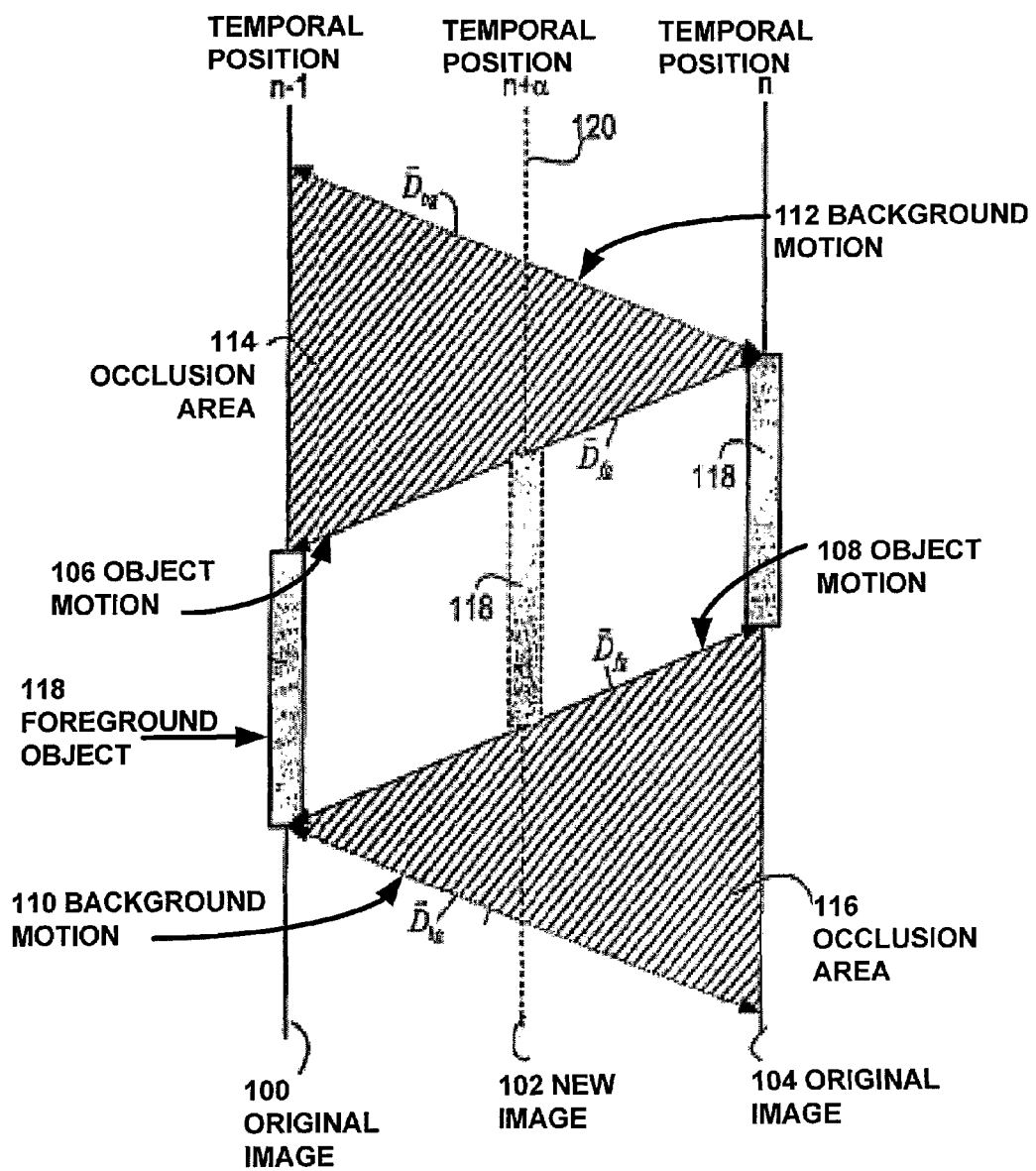

| | | | |
|---|---|---|---|
| 6,011,596 A | 1/2000 | Burl et al. | |
| 6,442,203 B1* | 8/2002 | Demos | 375/240.16 |
| 6,487,304 B1* | 11/2002 | Szeliski | 382/107 |
| 7,010,039 B2* | 3/2006 | De Haan et al. | 375/240.16 |
| 7,375,763 B2* | 5/2008 | Alfonso et al. | 348/448 |
| 2002/0075959 A1* | 6/2002 | Dantwala | 375/240.16 |
| 2005/0163355 A1* | 7/2005 | Mertens | 382/128 |

FOREIGN PATENT DOCUMENTS

| | | |
|---|---|---|
| WO | 0011863 A1 | 3/2000 |
| WO | WO 00/11863 | 3/2000 |
| WO | 02056589 A1 | 7/2002 |
| WO | WO 02/056589 A1 | 7/2002 |
| WO | 03041416 A1 | 5/2003 |
| WO | WO 03/041416 A1 | 5/2003 |

OTHER PUBLICATIONS

Kawaguchi, et al: Frame Rate up-Conversion Multiple Motion, IEEE, Oct. 1997, pp. 727-730, XP010254274.

M. J. W. Mertens, et al: Motion Vector Field Improvement for Picture Rate Conversion with Reduce Halo, SPIE, vol. 4310, 2001, pp. 352-362, XP008025129.

Olukayode A. Ojo, et al: Robust Motion-Compensated Video Upconversion, IEEE vol. 43, No. 4, Nov. 1997, pp. 1045-1056.

G. De Haan, et al: True-Motion with 3-D Recursive Search Block Matching, IEEE vol. 3. No. 5, Oct. 1993, pp. 368-379.

Yen-Kuang Chen, et al: Frame-Rate Up-conversion Using Transmitted True Motion Vectors, IEEE Dec. 1998, pp. 622-627, XP0100318331.

* cited by examiner

TEMPORAL INTERPOLATION OF A PIXEL ON BASIS OF OCCLUSION DETECTION

The invention relates to a method of determining a value for a particular pixel of a particular image being temporarily located intermediate a first image and a second image.

The invention further relates to a pixel value determining unit for determining a value for a particular pixel of a particular image being temporarily located intermediate a first image and a second image.

The invention further relates to an image processing apparatus comprising such a pixel value determining unit.

The invention further relates to a computer program product to be loaded by a computer arrangement, comprising instructions to determine a value for a particular pixel of a particular image being temporarily located intermediate a first image and a second image.

With occlusion area is meant, an area which corresponds with a portion of a scene being captured, that is visible in an image of a series of consecutive images but that is not visible in a next or previous image. This is caused by the fact that foreground objects in the scene, which are located more close to the camera than background objects, can cover portions of the background objects. In the case of movement of e.g. the foreground objects some portions of the background objects get occluded, while other portions of the background objects get uncovered.

Occlusion areas can cause artifacts in temporal interpolations. E.g. in the case of up-conversion, occlusion areas can result in so-called halos. In the case of up-conversion, motion vectors are estimated in order to compute up-converted output images by means of temporal interpolation. See e.g. the article "Robust motion-compensated video upconversion", by O. Ojo and G. de Haan, in IEEE Transactions on Consumer Electronics, Vol. 43, No. 4, Nov. 1997, pp. 1045-1056. For temporal interpolation, i.e. the computation of a new image intermediate two original input images, a number of pixels, which preferably relate to one and the same object are taken from consecutive images. This can not be done straightforward in the case of occlusion areas, because no related pixels can be found in both consecutive images. Other interpolation strategies are required, typically based on interpolation of pixel values of only a previous or next original image. It will be clear that the estimation of suitable motion vectors for occlusion areas is important.

It is an object of the invention to provide a method of the kind described in the opening paragraph which is relatively robust.

This object of the invention is achieved in that the method comprises:
  computing a first motion vector difference on basis of a first and second motion vector of a first motion vector field corresponding to the first image, the first motion vector being selected from the first motion vector field on basis of a particular spatial position of the particular pixel and a particular motion vector being estimated for the particular pixel;
  computing a second motion vector difference on basis of a third and fourth motion vector of a second motion vector field corresponding to the second image, the third motion vector being selected from the second motion vector field on basis of the particular spatial position of the particular pixel and the particular motion vector being estimated for the particular pixel; and
  establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

The inventor has discovered that by means of comparing a first difference between two appropriately selected motion vectors of a first motion vector field and a second difference between two appropriately selected motion vectors of a second motion vector field, it is possible to determine which of the two respective images should be selected to fetch one or more pixel values for establishing the value of the particular pixel. Typically, the two selected motion vectors of one of the two motion vector fields are substantially mutually equal. This is an indication that the probability is relatively high that these two motion vectors are both related to the background or the same foreground object. In that case, the probability is relatively high that with one of these two motion vectors a pixel can be fetched which is appropriate for the intermediate image. In case of occlusion, typically these two motion vectors are both related to the background.

Appropriate selection of the motion vectors is based on the particular spatial position of the particular pixel and on the particular motion vector being estimated for the particular pixel. Preferably, the second motion vector is selected from the first motion vector field on basis of the particular spatial position of the particular pixel and the first motion vector, and the fourth motion vector is selected from the second motion vector field on basis of the particular spatial position of the particular pixel and the third motion vector.

A value represents any type of human visible information, like luminance or color.

An embodiment of the method according to the invention comprises establishing the value of the particular pixel on basis of the first value of the first pixel and of the second value of the second pixel if the first motion vector difference and the second motion vector difference are smaller than a predetermined threshold. Instead of selecting a pixel value from either of the two images, in this embodiment according to the invention the value of the particular pixel is optionally based on pixel values of both images. This depends on tests to verify whether the two motion vector differences are both smaller than a predetermined threshold. Preferably this testing is performed by means of comparing the largest of the two motion vector differences with the predetermined threshold. This testing is an implicit occlusion detection. If only one of the motion vector differences is smaller than the predetermined threshold then it is assumed that the particular spatial position is located in an occlusion area. The type of occlusion, i.e. covering or uncovering, depends on which one of the two is smaller than the predetermined threshold. However if both motion vector differences are smaller than the predetermined threshold then it is assumed that the particular spatial position is not located in an occlusion area. In the latter case, the value of the particular pixel is based on pixel values of both input images.

An embodiment of the method according to the invention comprises establishing the value of the particular pixel by means of interpolation of the first value of the first pixel and a further value of a further pixel in a spatial neighborhood of the first pixel. In other words, sub-pixel accuracy is achieved in this embodiment according to the invention by means of interpolation of multiple pixel values.

It is a further object of the invention to provide a pixel value determining unit of the kind described in the opening paragraph which is relatively robust.

This object of the invention is achieved in that the pixel value determining unit comprises:

first computing means for computing a first motion vector difference on basis of a first and second motion vector of a first motion vector field corresponding to the first image, the first motion vector being selected from the first motion vector field on basis of a particular spatial position of the particular pixel and a particular motion vector being estimated for the particular pixel;

second computing means for computing a second motion vector difference on basis of a third and fourth motion vector of a second motion vector field corresponding to the second image, the third motion vector being selected from the second motion vector field on basis of the particular spatial position of the particular pixel and the particular motion vector being estimated for the particular pixel; and establishing means for establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

It is a further object of the invention to provide an image processing apparatus of the kind described in the opening paragraph comprising a pixel value determining unit which is relatively robust.

This object of the invention is achieved in that the pixel value determining unit comprises:

first computing means for computing a first motion vector difference on basis of a first and second motion vector of a first motion vector field corresponding to the first image, the first motion vector being selected from the first motion vector field on basis of a particular spatial position of the particular pixel and a particular motion vector being estimated for the particular pixel;

second computing means for computing a second motion vector difference on basis of a third and fourth motion vector of a second motion vector field corresponding to the second image, the third motion vector being selected from the second motion vector field on basis of the particular spatial position of the particular pixel and the particular motion vector being estimated for the particular pixel; and establishing means for establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

Optionally, the image processing apparatus further comprises a display device for displaying the output images. The image processing apparatus might e.g. be a TV, a set top box, a VCR (Video Cassette Recorder) player, a satellite tuner, a DVD (Digital Versatile Disk) player or recorder.

It is a further object of the invention to provide computer program product of the kind described in the opening paragraph which is relatively robust.

This object of the invention is achieved in that the computer program product, after being loaded, provides said processing means with the capability to carry out:

computing a first motion vector difference on basis of a first and second motion vector of a first motion vector field corresponding to the first image, the first motion vector being selected from the first motion vector field on basis of a particular spatial position of the particular pixel and a particular motion vector being estimated for the particular pixel;

computing a second motion vector difference on basis of a third and fourth motion vector of a second motion vector field corresponding to the second image, the third motion vector being selected from the second motion vector field on basis of the particular spatial position of the particular pixel and the particular motion vector being estimated for the particular pixel; and establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

Modifications of the pixel value determining unit and variations thereof may correspond to modifications and variations thereof of the image processing apparatus, the method and the computer program product, being described.

Figure 2:
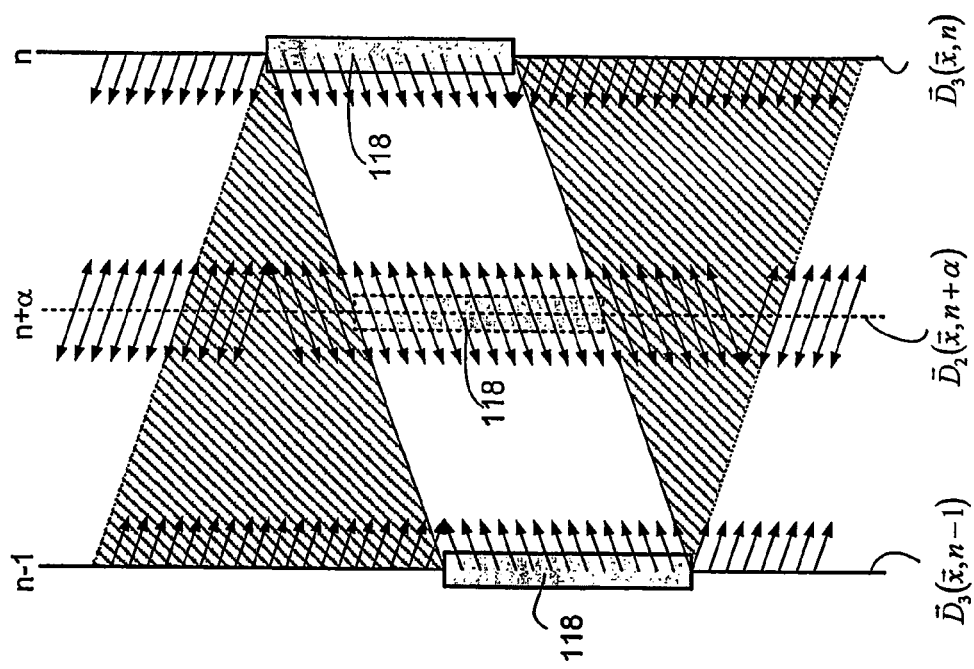
Figure 3:
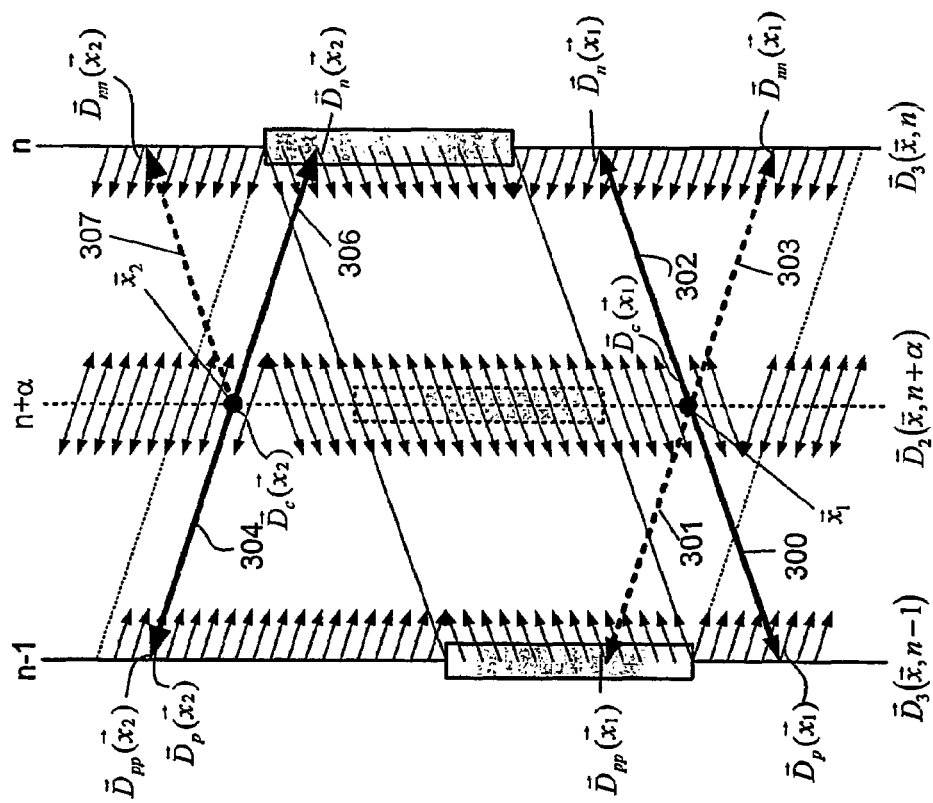
Figure 4:
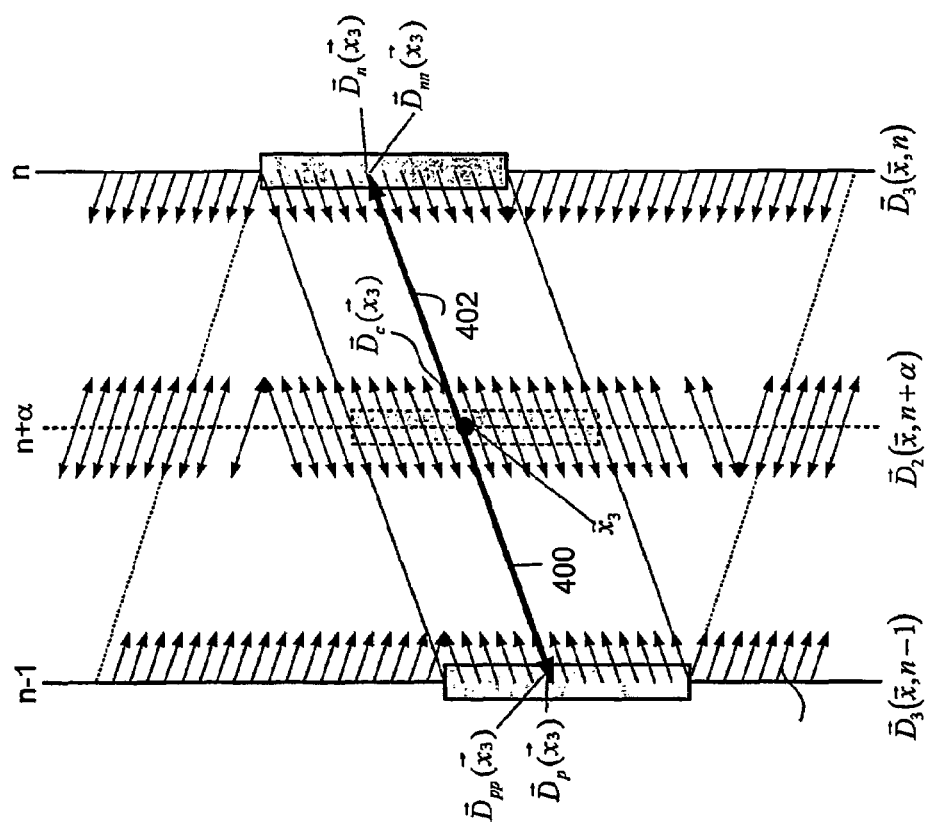
Figure 5:
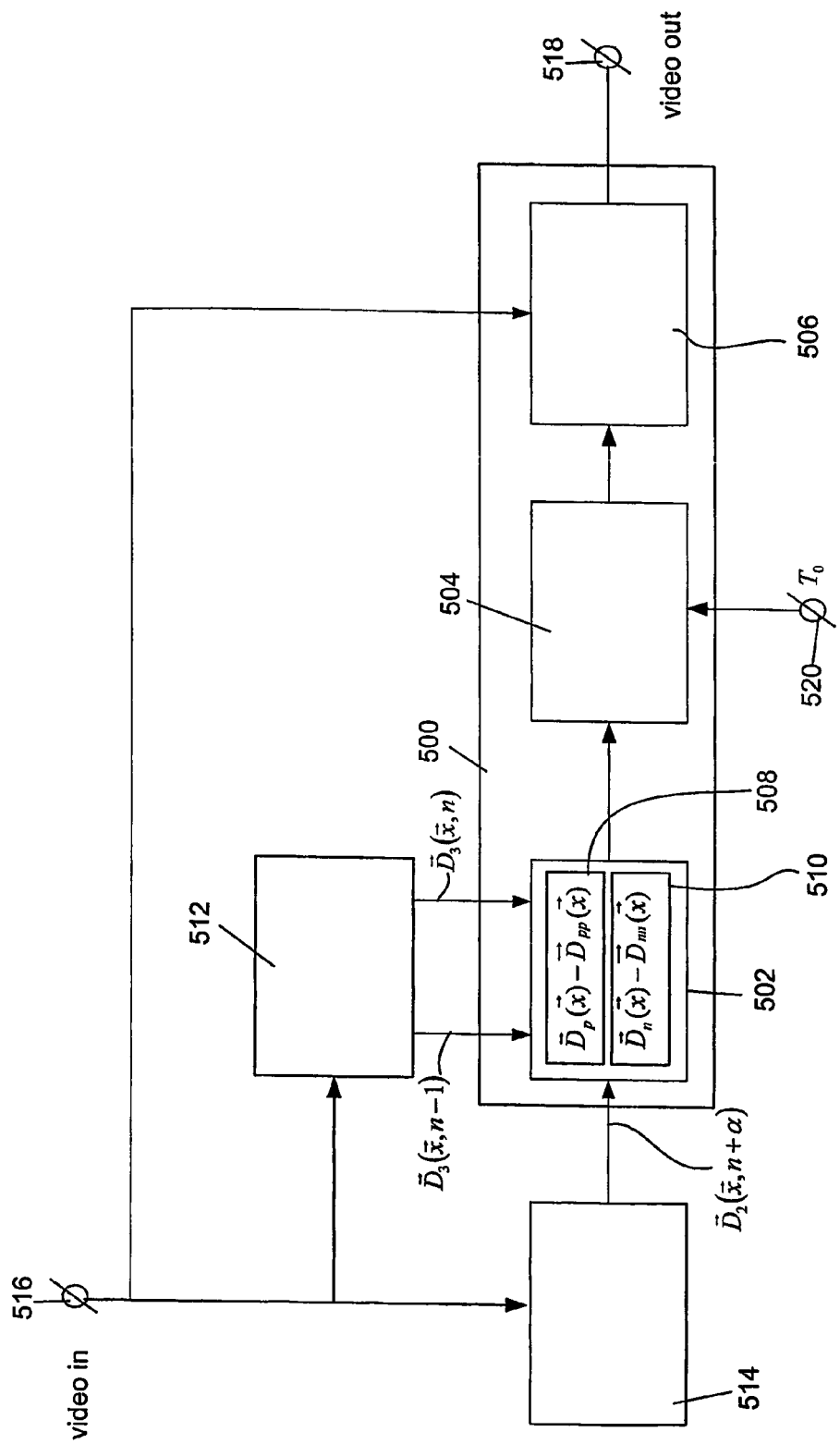
Figure 6:
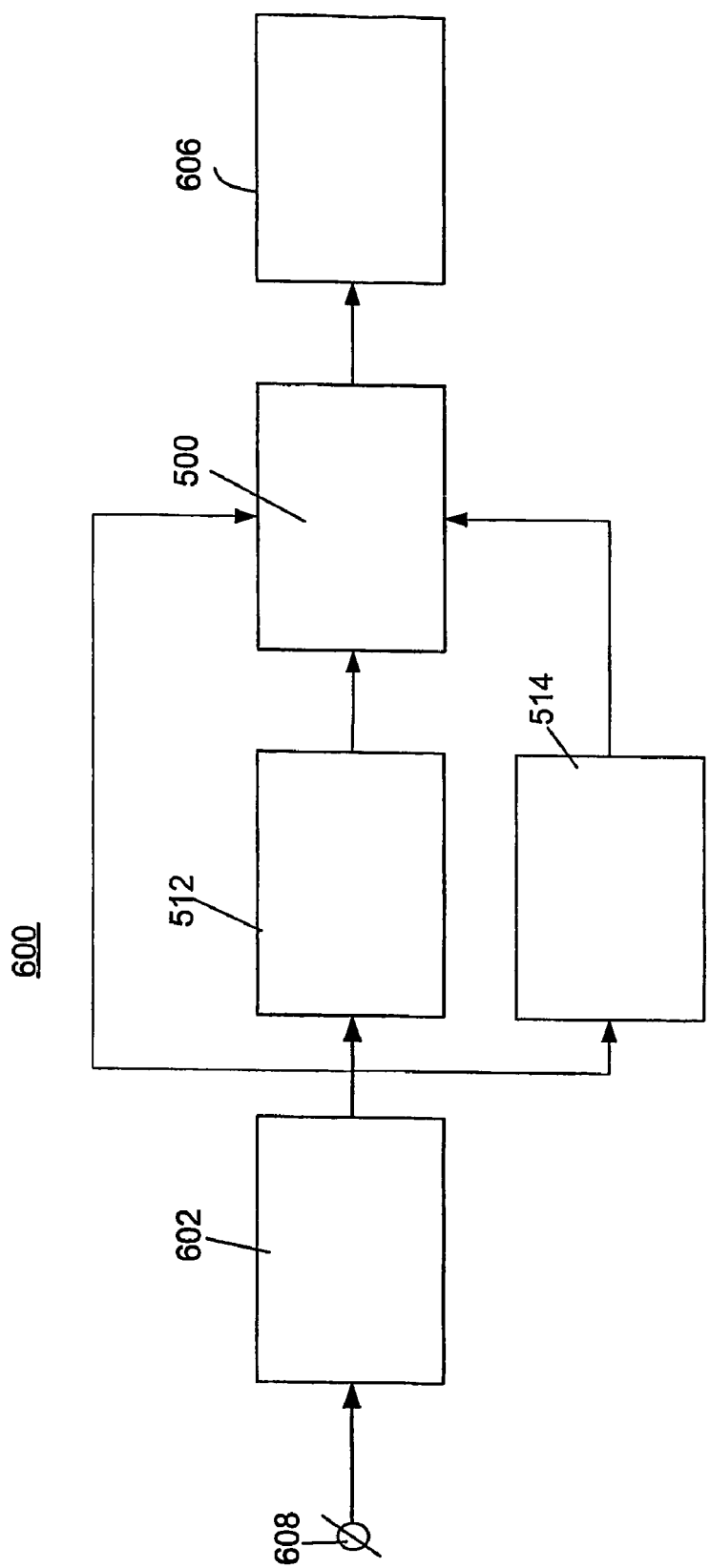

These and other aspects of the pixel value determining unit, of the image processing apparatus, of the method and of the computer program product, according to the invention will become apparent from and will be elucidated with respect to the implementations and embodiments described hereinafter and with reference to the accompanying drawings, wherein:

FIG. 1 schematically shows movement of a foreground object and movement of the background in a scene;

FIG. 2 schematically shows motion vector fields being estimated for the images shown in FIG. 1;

FIG. 3 schematically shows the method according to the invention for two example pixels both located in occlusion areas;

FIG. 4 schematically shows the method according to the invention for an example pixel which is not located in an occlusion area;

FIG. 5 schematically shows an embodiment of the pixel value determining unit, according to the invention, being provided with three motion vector fields; and FIG. 6 schematically shows an embodiment of the image processing apparatus according to the invention.

Same reference numerals are used to denote similar parts throughout the Figures.

FIG. 1 schematically shows movement of a foreground object 118 and movement of the background in a scene. In FIG. 1 two original images 100 and 104 at temporal position n−1 and n are depicted. An object 118 within these images is moving in an upwards direction $\vec{D}_{fg}$, which is denoted by the gray rectangles connected by the solid black lines 106 and 108. The long narrow dotted black lines 110 and 112 indicate the motion of the background $\vec{D}_{bg}$, which is downwards. The hatched regions 114 and 116 indicate occlusion areas. A new image 102, which has to be created at temporal position n+α with $-1 \leq \alpha \leq 0$ is indicated by the dashed line 120.

FIG. 2 schematically shows motion vector fields being estimated for the images shown in FIG. 1. i.e. the estimated motion vector fields are indicated by the arrows. A first motion vector field is estimated for the first 100 of the two original images and a second motion vector field is estimated for the second 104 of the two original images. These two motion vector fields are computed by means of a three-frame motion estimator. The first motion vector field is denoted by $\vec{D}_3(\vec{x},n-1)$. This first motion vector field is estimated between luminance frames $F(\vec{x},n-2)$, $F(\vec{x},n-1)$ and $F(\vec{x},n)$. The second motion vector field is denoted by $\vec{D}_3(\vec{x},n)$. This second motion vector field is estimated between luminance frames $F(\vec{x},n-1)$, $F(\vec{x},n)$ and $F(\vec{x},n+1)$. Besides that an initial motion vector field has been computed for the temporal position n+α intermediate the first and second motion vector field. This initial motion vector field $\vec{D}_2(\vec{x},n+\alpha)$ is estimated between luminance frames $F(\vec{x},n-1)$ and $F(\vec{x},n)$. Note that the motion vector fields $\vec{D}_3(\vec{x},n-1)$ and $\vec{D}_3(\vec{x},n)$ of the three-frame motion estimator substantially match with the foreground object 118, whereas the motion vector field $\vec{D}_2(\vec{x},n+\alpha)$ of the two-frame motion estimator shows foreground vectors which extends into the background.

According to the method of the invention an image being temporarily located intermediate a first and a second input image can be computed by using three motion vector fields $\vec{D}_3(\vec{x},n-1)$, $\vec{D}_3(\vec{x},n)$ and $\vec{D}_2(\vec{x},n+\alpha)$. That means that the back-ground vector is determined in occlusion areas and applied to fetch a pixel from one of the two input images.

FIG. 3 schematically shows the method according to the invention for two example pixels at spatial positions $\vec{x}_1$ and $\vec{x}_2$, respectively. First consider the situation around the pixel at location $\vec{x}_1$. The motion vector $\vec{D}_c(\vec{x}_1)$ from the motion vector field $\vec{D}_2(\vec{x},n+\alpha)$ is used to fetch the motion vectors $\vec{D}_p(\vec{x}_1)$ and $\vec{D}_n(\vec{x}_1)$ from the first vector field $\vec{D}_3(\vec{x},n-1)$ and the second motion vector field $\vec{D}_3(\vec{x},n)$, respectively.

$$\vec{D}_p(\vec{x}_1)=\vec{D}_3(\vec{x}_1-(\alpha+1)\vec{D}_c(\vec{x}_1),n-1) \quad (1)$$

$$\vec{D}_n(\vec{x}_1)=\vec{D}_3(\vec{x}_1\alpha\vec{D}_c(\vec{x}_1),n) \quad (2)$$

This selection process is indicated by the thick black arrows 300 and 302, respectively. Both motion vectors $\vec{D}_p(\vec{x}_1)$ and $\vec{D}_n(\vec{x}_1)$ are background vectors. With $\vec{D}_p(\vec{x}_1)$, the vector $\vec{D}_{pp}(\vec{x}_1)$ is fetched from $\vec{D}_3(\vec{x},n-1)$ and with vector $\vec{D}_n(\vec{x}_1)$, the vector $\vec{D}_{nn}(\vec{x}_1)$ is fetched from $\vec{D}_3(\vec{x},n)$.

$$\vec{D}_{pp}(\vec{x}_1)=\vec{D}_3(\vec{x}_1-(\alpha+1)\vec{D}_p(\vec{x}_1),n-1) \quad (3)$$

$$\vec{D}_{nn}(\vec{x}_1)=\vec{D}_3(\vec{x}_1-\alpha\vec{D}_n(\vec{x}_1),n) \quad (4)$$

This fetching is indicated by the thick black dotted arrows 301 and 303. It can be seen that $\vec{D}_{nn}(\vec{x}_1)$ is also a background vector, but $\vec{D}_{pp}(\vec{x}_1)$ is a foreground vector. This means that $\vec{D}_n(\vec{x}_1)$ and $\vec{D}_{nn}(\vec{x}_1)$ are substantially mutually equal, i.e. the first motion vector difference is below the predetermined threshold $T_0$. However there is a significant difference between $\vec{D}_p(\vec{x}_1)$ and $\vec{D}_{pp}(\vec{x}_1)$, i.e. the second motion vector difference is larger than the predetermined threshold $T_0$. Hence, the value of the pixel at spatial position $\vec{x}_1$ of the intermediate image 102 will be based on a value of a pixel of the second image 104 at temporal position n, because the second motion vector difference is smaller than the first motion vector difference.

A similar process can be used to establish the appropriate motion vector for the other pixel at location $\vec{x}_2$. The motion vector $\vec{D}_c(\vec{x}_2)$ from the motion vector field $\vec{D}_2(\vec{x},n+\alpha)$ is used to fetch the motion vectors $\vec{D}_p(\vec{x}_2)$ and $\vec{D}_n(\vec{x}_2)$ from the first vector field $\vec{D}_3(\vec{x},n-1)$ and the second motion vector field $\vec{D}_3(\vec{x},n)$, respectively.

$$\vec{D}_p(\vec{x}_2)=\vec{D}_3(\vec{x}_2-(\alpha+1)\vec{D}_c(\vec{x}_2),n-1) \quad (5)$$

$$\vec{D}_n(\vec{x}_2)=\vec{D}_3(\vec{x}_2-\alpha\vec{D}_c(\vec{x}_2),n) \quad (6)$$

This selection process is indicated by the thick black arrows 304 and 306, respectively. Here, the fetched motion vectors with $\vec{D}_p(\vec{x}_2)$ and $\vec{D}_n(\vec{x}_2)$ are background and foreground vectors, respectively. With $\vec{D}_p(\vec{x}_1)$, the vector $\vec{D}_{pp}(\vec{x}_1)$ is fetched from $\vec{D}_3(\vec{x},n-1)$ and with vector $\vec{D}_n(\vec{x}_1)$, the vector $\vec{D}_{nn}(\vec{x}_1)$ is fetched from $\vec{D}_3(\vec{x},n)$.

$$\vec{D}_{pp}(\vec{x}_2)=\vec{D}_3(\vec{x}_2-(\alpha+1)\vec{D}_p(\vec{x}_2),n-1) \quad (7)$$

$$\vec{D}_{nn}(\vec{x}_2)=\vec{D}_3(\vec{x}_2-\alpha\vec{D}_n(\vec{x}_2),n) \quad (8)$$

This fetching is indicated by the thick black arrows 304 and 307. It can be seen that $\vec{D}_{nn}(\vec{x}_2)$ and $\vec{D}_{pp}(\vec{x}_2)$ are both background vectors. This means that $\vec{D}_p(\vec{x}_2)$ and $\vec{D}_{pp}(\vec{x}_2)$ are substantially mutually equal, i.e. the second motion vector difference is below the predetermined threshold $T_0$. However there is a significant difference between $\vec{D}_n(\vec{x}_2)$ and $\vec{D}_{nn}(\vec{x}_2)$, i.e. the first motion vector difference is larger than the predetermined threshold $T_0$. Hence, the value of the pixel at spatial position $\vec{x}_2$ of the intermediate image 102 will be based on a value of a pixel of the first image 100 at temporal position n−1, because the first motion vector difference is smaller than the second motion vector difference.

In general, occlusion is detected if:

$$\|\vec{D}_p-\vec{D}_{pp}\|>T_0 \vee \|\vec{D}_n-\vec{D}_{nn}\|>T_0 \quad (9)$$

In the case that occlusion is detected a classification is made into covering and uncovering. The pixel is in an uncovering area if $$\|\vec{D}_p-\vec{D}_{pp}\|>T_0 \wedge \|\vec{D}_n-\vec{D}_{nn}\|\leq T_0 \quad (10)$$

and in a covering area if $$\|\vec{D}_p-\vec{D}_{pp}\|\leq T_0 \wedge \|\vec{D}_n-\vec{D}_{nn}\|>T_0 \quad (11)$$

So, the pixel at spatial position $\vec{x}_1$ is located in an uncovering area and the pixel at spatial position $\vec{x}_2$ is located in a covering area.

FIG. 4 schematically shows the method according to the invention for an example pixel $\vec{x}_1$ which is not located in an occlusion area. The motion vector $\vec{D}_c(\vec{x}_3)$ from the motion vector field $\vec{D}_2(\vec{x},n+\alpha)$ is used to fetch the motion vectors $\vec{D}_p(\vec{x}_3)$ and $\vec{D}_n(\vec{x}_3)$ from the first vector field $\vec{D}_3(\vec{x},n-1)$ and the second motion vector field $\vec{D}_3(\vec{x},n)$, respectively.

$$\vec{D}_p(\vec{x}_3) = \vec{D}_3(\vec{x}_3 - (\alpha+1)\vec{D}_c(\vec{x}_3), n-1) \quad (12)$$

$$\vec{D}_n(\vec{x}_3) = \vec{D}_3(\vec{x}_3 - \alpha\vec{D}_c(\vec{x}_3), n) \quad (13)$$

This selection process is indicated by the thick black arrows 400 and 402, respectively. Both motion vectors $\vec{D}_p(\vec{x}_2)$ and $\vec{D}_n(\vec{x}_2)$ are foreground vectors. With $\vec{D}_p(\vec{x}_3)$, the vector $\vec{D}_{pp}(\vec{x}_3)$ is fetched from $\vec{D}_3(\vec{x},n-1)$ and with vector $\vec{D}_n(\vec{x}_3)$, the vector $\vec{D}_{nn}(\vec{x}_3)$ is fetched from $\vec{D}_3(\vec{x},n)$.

$$\vec{D}_{pp}(\vec{x}_3) = \vec{D}_3(\vec{x}_3 - (\alpha+1)\vec{D}_p(\vec{x}_3), n-1) \quad (14)$$

$$\vec{D}_{nn}(\vec{x}_3) = \vec{D}_3(\vec{x}_3 - \alpha\vec{D}_n(\vec{x}_3), n) \quad (15)$$

This fetching is also indicated by the thick black arrows 400 and 402, respectively. It can be seen that $\vec{D}_{nn}(\vec{x}_3)$ and $\vec{D}_{pp}(\vec{x}_1)$ are also foreground vectors. This means that $\vec{D}_n(\vec{x}_3)$ and $\vec{D}_{nn}(\vec{x}_3)$ are substantially mutually equal, i.e. the first motion vector difference is below the predetermined threshold $T_0$. Besides that, $\vec{D}_p(\vec{x}_3)$ and $\vec{D}_{pp}(\vec{x}_3)$ are substantially mutually equal, i.e. the second motion vector difference is below the predetermined threshold $T_0$. Hence, the value of the pixel at spatial position $\vec{x}_3$ of the intermediate image 102 will be based on a first value of a first pixel of the first image 100 at temporal position n−1 and based on a second value of a second pixel of the second image 104 at temporal position n.

FIG. 5 schematically shows an embodiment of the pixel value determining unit 500 according to the invention, being arranged to compute an image being temporarily located intermediate a first image and a second image, the intermediate image being located at temporal position n+α. The pixel value determining unit 500 is provided with three motion vector fields. The first $\vec{D}_3(\vec{x},n-1)$ and second $\vec{D}_3(\vec{x},n)$ of these provided motion vector fields are computed by means of a three-frame motion estimator 512. An example of a three-frame motion estimator 512 is disclosed in U.S. Pat No. 6,011,596. The third provided motion vector field $\vec{D}_2(\vec{x},n+\alpha)$ is computed by means of a two-frame motion estimator 514. This two-frame motion estimator 508 is e.g. as specified in the article "True-Motion Estimation with 3-D Recursive Search Block Matching" by G. de Haan et al. in IEEE Transactions on circuits and systems for video technology, vol. 3, no. 5, October 1993, pages 368-379.

The motion estimators 512 and 514 and the pixel value determining unit 500 are provided with an input video signal representing the first and second image and other input images. The pixel value determining unit 500 provides an output video signal representing the first and second image and the intermediate image at the output connector 518. The pixel value determining unit 500 comprises a control interface 520 for receiving a control signal representing a predetermined threshold $T_0$.

The pixel value determining unit 500 according to the invention comprises:

a motion vector compare unit 502;
a decision unit 504; and
a pixel value computation unit 506.

The motion vector compare unit 502 is arranged to fetch the corresponding motion vectors from the three motion vector fields $\vec{D}_3(\vec{x},n-1)$, $\vec{D}_2(\vec{x},n+\alpha)$ and $\vec{D}_3(\vec{x},n)$. The motion vector compare unit 502 comprises:

a first computing unit 508 for computing a first motion vector difference on basis of a first $\vec{D}_p$ and second $\vec{D}_{pp}$ motion vector of a first motion vector field $\vec{D}_3(\vec{x},n-1)$ corresponding to the first image, the first motion vector $\vec{D}_p$ being selected from the first motion vector field $\vec{D}_3(\vec{x},n-1)$ on basis of a particular spatial position $\vec{x}$ of the particular pixel and a particular motion vector $\vec{D}_c$ being estimated for the particular pixel; and a second computing unit 510 for computing a second motion vector difference on basis of a third $\vec{D}_n$ and fourth $\vec{D}_{nn}$ motion vector of a second motion vector field $\vec{D}_3(\vec{x},n)$ corresponding to the second image, the third motion vector $\vec{D}_n$ being selected from the second motion vector field $\vec{D}_3(\vec{x},n)$ on basis of the particular spatial position $\vec{x}$ of the particular pixel and the particular motion vector $\vec{D}_c$ being estimated for the particular pixel.

The decision unit 504 is arranged to determine the type of area in which the particular pixel is located. So, the decision unit 504 is arranged to check whether the two motion vector differences are smaller than the predetermined threshold $T_0$. The type of area is then established as specified in Equations 9-11. The decision unit 504 is further arranged to check which motion vector or optionally motion vectors should be used to fetch the pixel values from the first or second image for the computation of the pixel value of the particular pixel of the intermediate image. In general, the value of the particular pixel is based on a first value of a first pixel of the first image if the first motion vector difference is smaller than the second motion vector difference and the value of the particular pixel is based on a second value of a second pixel of the second image if the second motion vector difference is smaller than the first motion vector difference. The value of the particular pixel is based on the first value of the first pixel and of the second value of the second pixel if the first motion vector difference and the second motion vector difference are smaller than the predetermined threshold $T_0$.

The pixel value computation unit 506 is arranged to determine the actual value of the particular pixel. That might be a direct copy of a pixel value of the first or second image. Preferably the value is based on an interpolation of multiple pixel values, in particular when the motion vectors are sub-pixel accurate.

The working of the pixel value determining unit 500 according to the invention is as described in connection with FIG. 3 and FIG. 4.

The motion vector compare unit 502, the decision unit 504, the pixel value computation unit 506, the three-frame motion estimator 512 and the two-frame motion estimator 514 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

The computation of motion vectors for the different temporal positions n−1, n+α and n is preferably performed synchronously with the computation of the pixel values of the intermediate image. That means that a particular motion vector field, e.g. for temporal position n−1 does not necessarily correspond to the group of motion vectors which together represent the motion of all pixels of the corresponding original input video image. In other words, a motion vector field might correspond to a group of motion vectors which together represent the motion of a portion of the pixels, e.g. only 10% of the pixels of the corresponding original input video image.

FIG. 6 schematically shows an embodiment of the image processing apparatus 600 according to the invention, comprising:
- receiving means 602 for receiving a signal corresponding to a sequence of video images;
- a first motion estimator 512 for estimating a first motion vector field for a first one of the video images and a second motion vector field for a second one of the video images;
- a second motion estimator 514 for estimating a third motion vector field for an output image being temporarily located intermediate the first one of the video images and the second one of the video images;
- the pixel value determining unit 500, as described in connection with FIG. 5; and
- a display device 606 for displaying the output images of the pixel value determining unit 500.

The signal may be a broadcast signal received via an antenna or cable but may also be a signal from a storage device like a VCR (Video Cassette Recorder) or Digital Versatile Disk (DVD). The signal is provided at the input connector 608. The image processing apparatus 600 might e.g. be a TV. Alternatively the image processing apparatus 600 does not comprise the optional display device but provides the output images to an apparatus that does comprise a display device 606. Then the image processing apparatus 600 might be e.g. a set top box a satellite-tuner, a VCR player, a DVD player or recorder. Optionally the image processing apparatus 600 comprises storage means, like a hard-disk or means for storage on removable media, e.g. optical disks. The image processing apparatus 600 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of determining a value for a particular pixel of a particular image being temporarily located intermediate a first image and a second image, the method comprising an image apparatus that perform the following steps:

computing a first motion vector difference on basis of a first ($\vec{D}_p$) and second ($\vec{D}_{pp}$) motion vector of a first motion vector field ($\vec{D}_3(\vec{x},n-1)$) corresponding to the first image, the first motion vector ($\vec{D}_p$) being selected from the first motion vector field ($\vec{D}_3(\vec{x},n-1)$) on basis of a particular spatial position ($\vec{x}$) of the particular pixel and a particular motion vector ($\vec{D}_c$) being estimated for the particular pixel and the second motion vector ($\vec{D}_{pp}$) being selected from the first motion vector field ($\vec{D}_3(\vec{x},n-1)$) using the first motion vector ($\vec{D}_p$);

computing a second motion vector difference on basis of a third ($\vec{D}_n$) and fourth ($\vec{D}_{nn}$) motion vector of a second motion vector field ($\vec{D}_3(\vec{x},n)$) corresponding to the second image, the third motion vector ($\vec{D}_n$) being selected from the second motion vector field ($\vec{D}_3(\vec{x},n)$) on basis of the particular spatial position ($\vec{x}$) of the particular pixel and the particular motion vector ($\vec{D}_c$) being estimated for the particular pixel and the fourth motion vector ($\vec{D}_{nn}$) being selected from the second motion vector field ($\vec{D}_3(\vec{x},n)$) using the third motion vector ($\vec{D}_n$);

and establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

2. A method of determining a value for a particular pixel as claimed in claim 1, wherein the second motion vector ($\vec{D}_{pp}$) is selected from the first motion vector field ($\vec{D}_3(\vec{x},n-1)$) on basis of the particular spatial position ($\vec{x}$) of the particular pixel and the first motion vector ($\vec{D}_p$).

3. A method of determining a value for a particular pixel as claimed in claim 2, wherein the fourth motion vector ($\vec{D}_{nn}$) is selected from the second motion vector field ($\vec{D}_3(\vec{x},n)$) on basis of the particular spatial position ($\vec{x}$) of the particular pixel and the third motion vector ($\vec{D}_n$).

4. A method of determining a value for a particular pixel as claimed in claim 1, comprising establishing the value of the particular pixel on basis of the first value of the first pixel and of the second value of the second pixel if the first motion vector difference and the second motion vector difference are smaller than a predetermined threshold.

5. A method of determining a value for a particular pixel as claimed in claim 1, comprising establishing the value of the particular pixel by means of interpolation of the first value of the first pixel and a further value of a further pixel in a spatial neighborhood of the first pixel.

6. A pixel value determining unit for determining a value for a particular pixel of a particular image being temporarily located intermediate a first image and a second image, the pixel value determining unit comprising:

first computing means for computing a first motion vector difference on basis of a first ($\vec{D}_p$) and second ($\vec{D}_{pp}$) motion vector of a first motion vector field ($\vec{D}_3(\vec{x},n-1)$) corresponding to the first image, the first motion vector ($\vec{D}_p$) being selected from the first motion vector field ($\vec{D}_3(\vec{x},n-1)$) on basis of a particular spatial position ($\vec{x}$) of the particular pixel and a particular motion vector ($\vec{D}_c$) being estimated for the particular pixel and the second motion vector ($\vec{D}_{pp}$) being selected from the first motion vector field ($\vec{D}_3(\vec{x}\,n-1)$) using the first motion vector ($\vec{D}_p$);

second computing means for computing a second motion vector difference on basis of a third ($\vec{D}_n$)) and fourth ($\vec{D}_{nn}$) motion vector of a second motion vector field ($\vec{D}_3(\vec{x},n)$) corresponding to the second image, the third motion vector ($\vec{D}_n$) being selected from the second motion vector field ($\vec{D}_3(\vec{x},n)$) on basis of the particular spatial position ($\vec{x}$) of the particular pixel and the particular motion vector ($\vec{D}_c$) being estimated for the particular pixel and the fourth motion vector ($\vec{D}_{nn}$) being selected from the second motion vector field ($\vec{D}_3(\vec{x},n)$) using the third motion vector ($\vec{D}_n$);

and establishing means for establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

7. An image processing apparatus comprising:

receiving means for receiving a signal corresponding to a sequence of video images;

motion estimation means for estimating a first motion vector field for a first one of the video images and a second motion vector field for a second one of the video images;

and a pixel value determining unit for determining a value for a particular pixel of a particular image being temporarily located intermediate the first one of the video images and the second one of the video images, the pixel value determining unit comprising:

first computing means for computing a first motion vector difference on basis of a first ($\vec{D}_p$) and second ($\vec{D}_{pp}$) motion vector of a first motion vector field ($\vec{D}_3(\vec{x},n-1)$) corresponding to the first image, the first motion vector ($\vec{D}_p$) being selected from the first motion vector field ($\vec{D}_3(\vec{x},n-1)$) on basis of a particular spatial position ($\vec{x}$) of the particular pixel and a particular motion vector ($\vec{D}_c$) being estimated for the particular pixel and the second motion vector ($\vec{D}_{pp}$) being selected from the first motion vector field ($\vec{D}_3(\vec{x},n-1)$) using the first motion vector ($\vec{D}_p$);

second computing means for computing a second motion vector difference on basis of a third ($\vec{D}_n$) and fourth ($\vec{D}_{nn}$) motion vector of a second motion vector field ($\vec{D}_3(\vec{x},n)$) corresponding to the second image, the third motion vector ($\vec{D}_n$) being selected from the second motion vector field ($\vec{D}_3(\vec{x},n)$) on basis of the particular spatial position ($\vec{x}$) of the particular pixel and the particular motion vector ($\vec{D}_c$) being estimated for the particular pixel and the fourth motion vector ($\vec{D}_{nn}$) being selected from the second motion vector field ($\vec{D}_3(\vec{x},n)$) using the third motion vector ($\vec{D}_n$);

establishing means for establishing the value of the particular pixel on basis of a first value of a first pixel of the first one of the video images if the first motion vector difference is smaller than the second motion vector difference and establishing the value of the particular pixel on basis of a second value of a second pixel of the second one of the video images if the second motion vector difference is smaller than the first motion vector difference.

8. An image processing apparatus as claimed in claim 7, further comprising a display device for displaying the output images.

9. An image processing apparatus as claimed in claim 8, being a TV.

10. A computer program product embodied on a computer-readable medium to be loaded by a computer arrangement, comprising instructions to determine a value for a particular pixel of a particular image being temporarily located intermediate a first image and a second image, the computer program product, after being loaded providing said processing means with the capability to carry out:

computing a first motion vector difference on basis of a first ($\vec{D}_p$) and second ($\vec{D}_{pp}$) motion vector of a first motion vector field ($\vec{D}_3(\vec{x},n-1)$) corresponding to the first image, the first motion vector ($\vec{D}_p$) being selected from the first motion vector field ($\vec{D}_3(\vec{x},n-1)$) on basis of a particular spatial position ($\vec{x}$) of the particular pixel and a particular motion vector ($\vec{D}_c$) being estimated for the particular pixel and the second motion vector ($\vec{D}_{pp}$) being selected from the first motion vector field ($\vec{D}_3(\vec{x},n-1)$) using the first motion vector ($\vec{D}_p$);

computing a second motion vector difference on basis of a third ($\vec{D}_n$) and fourth ($\vec{D}_{nn}$) motion vector of a second motion vector field ($\vec{D}_3(\vec{x},n)$) corresponding to the second image, the third motion vector ($\vec{D}_n$) being selected from the second motion vector field ($\vec{D}_3(\vec{x},n)$) on basis of the particular spatial position ($\vec{x}$) of the particular pixel and the particular motion vector ($\vec{D}_c$) being estimated for the particular pixel and the fourth motion vector ($\vec{D}_{nn}$) being selected from the second motion vector field ($\vec{D}_3(\vec{x},n)$) using the third motion vector ($\vec{D}_n$);

and establishing the value of the particular pixel on basis of a first value of a first pixel of the first image if the first motion vector difference is smaller than the second motion vector difference and establishing the value of the particular pixel on basis of a second value of a second pixel of the second image if the second motion vector difference is smaller than the first motion vector difference.

* * * * *